219-121 SR

5/6/86 OR 4,587,397

United States Patent [19]

Camacho et al.

[11] Patent Number: 4,587,397

[45] Date of Patent: May 6, 1986

[54] PLASMA ARC TORCH

[75] Inventors: Salvador L. Camacho; David P. Camacho, both of Raleigh, N.C.

[73] Assignee: Plasma Energy Corporation, Raleigh, N.C.

[21] Appl. No.: 670,399

[22] Filed: Nov. 9, 1984

Related U.S. Application Data

[63] Continuation-in-part of Ser. No. 557,217, Dec. 2, 1983, which is a continuation-in-part of Ser. No. 460,062, Jan. 21, 1983.

[51] Int. Cl.[4] .................... B23K 7/00

[52] U.S. Cl. .................... 219/121 PM; 219/121 PP; 219/121 PR; 219/121 PY

[58] Field of Search ....... 219/121 P, 121 PY, 121 PP, 219/121 PR, 121 PM, 74, 75; 313/231.31, 231.41, 231.51

[56] References Cited

U.S. PATENT DOCUMENTS 3,294,952 12/1966 Eschenbach .................... 219/121 P 3,304,774 2/1967 Poole .................... 219/121 PR 3,533,756 10/1970 Houseman .................... 219/121 P

*Primary Examiner*—M. H. Paschall

*Attorney, Agent, or Firm*—Bell, Seltzer, Park & Gibson

[57] ABSTRACT

A plasma arc torch is disclosed which comprises front and rear coaxially aligned electrodes, and vortex generator for generating a vortical flow of gas, such as air, between the two electrodes. A power supply system is operatively connected to the two electrodes for generating an arc which is adapted to extend axially from the rear electrode through the vortical flow of gas and to an attachment point located on the front electrode. The bore of the front electrode includes a cup-shaped outer end portion which defines a forwardly facing radial shoulder. By proper coordination of the power and gas delivery systems, the arc may be made to attach to the radial shoulder of the front electrode, and such that the erosion of the front electrode occurs along an axial direction rather than a radial direction. The vortex generator also includes structure for continuously varying the pressure of the gas delivered between the electrodes, which serves to distribute the arc attachment point and the resulting erosion on each of the electrodes.

12 Claims, 6 Drawing Figures

PLASMA ARC TORCH

This is a continuation in part of copending application Ser. No. 557,217, filed Dec. 2, 1983, which in turn is a continuation in part of copending application Ser. No. 460,062, filed Jan. 21, 1983.

The present invention relates to a plasma arc torch of the type wherein an electric arc is employed to heat a gas to a high temperature, and which is useful for example in the cutting or welding of metals, or the heating of various materials.

Plasma arc torches are usually designed for operation in one of two modes, which are commonly referred to as the transfer arc mode and the non-transfer arc mode. For the transfer arc mode of operation, the torch typically comprises a tubular rear electrode having a closed inner end, a tubular front electrode which acts as a collimating nozzle, and a gas introducing chamber between the two electrodes. The electric arc extends from the rear electrode through the gas introducing chamber and front electrode, and the arc extends forwardly from the torch and attaches or "transfers" to an external grounded workpiece. The prior patents to Baird, U.S. Pat. No. 3,194,941 and Camacho, U.S. Pat. Nos. 3,673,375 and 3,818,174 illustrate torches of the transfer arc type.

In the case of a plasma arc torch adapted for operation in the non-transfer arc mode, the electric arc extends from the rear electrode through the gas introducing chamber, and it attaches to the front electrode. A torch of this general type is illustrated in the patent to Muehlberger, U.S. Pat. No. 3,740,522.

In existing non-transfer plasma arc torches, the front electrode comprises a tubular metal member having a central bore to which the arc attaches. The arc will naturally tend to attach to the bore at a single point, and the attachment of the arc results in wear or erosion of the metallic material at that point. The erosion moves through the wall of the electrode in a radially outward direction, and since the wall of the front electrode is necessarily somewhat thin, the front electrode has a very short operating life by reason of the fact that the erosion moves completely through the wall relatively quickly.

Rapid erosion and short operating life are also problems with respect to the rear electrode, in torches adapted for either the transfer or non-transfer modes of operation. Here again, the arc will naturally tend to attach to and wear at a single point within the bore of the rear electrode, and the arc will quickly erode through the wall at that point. In the above referenced patent to Baird, it is suggested that alternating current be employed to power the electrode, which is said to cause the arc attachment point to move along the length of the rear electrode and thereby disperse the wear. Also, the Baird patent suggests that a field coil be placed about the rear electrode to cause the arc to rotate, but these proposed improvements involve a relatively complex and expensive electrical system.

It has also been previously known that rotation of the arc attachment point in the rear electrode can be achieved aerodynamically, which is more efficient in that no specially designed electrical power supply system is required for this purpose. The known aerodynamic system includes the tangential injection of the gas into the gas introducing chamber to produce a vortical flow of gas in the chamber. Some of this gas moves rearwardly into the rear electrode, creating a well defined point within the rear electrode at which the pressure of the entering gas equals the back pressure in the electrode. At that point, the entering gas turns around and goes back out, creating a low pressure zone where the arc attaches. It has also been proposed to manually vary the pressure and thus the gas flow rate at periodic intervals, so that the point at which the arc attaches will move axially within the electrode upon each pressure change. Thus some operators of plasma torches have installed a manual pressure valve in the gas delivery system, with the operator periodically manually regulating the valve in order to change the arc attachment location. However, this procedure does not produce uniform erosion, and it results in localized wear points.

It is accordingly an object of the present invention to provide a plasma arc torch of the type adapted for operation in the non-transfer mode, and wherein the problem of rapid erosion and failure of the front electrode is substantially alleviated.

It is also an object of the present invention to provide a plasma arc torch of the described type and which is operable in either the transfer or non-transfer modes of operation, and which has provision for the efficient and uniform distribution of the wear of the rear electrode, to thereby extend the life of the rear electrode.

These and other objects and advantages of the present invention are achieved in the embodiment illustrated herein by the provision of a plasma arc torch which comprises a torch housing, a rear electrode mounted within the housing and which includes a closed inner end and an open outer end, and a front electrode comprising a tubular metal member mounted within the housing and in coaxial alignment with the rear electrode. Vortex generating means is provided for generating a vortical flow of a gas at a location intermediate the rear and outer electrodes, and power supply means is provided for generating an arc which extends axially from the rear electrode and through the vortical flow of gas. In accordance with one aspect of the present invention, the front electrode has a bore which includes an outer end portion which is cup-shaped in cross section to define an outwardly facing radial shoulder, and the power supply means is operatively connected to the front electrode so that the arc attaches at a point located on the radial shoulder of the bore of the front electrode. Thus the attachment of the arc to the radial shoulder results in erosion of the material of the front electrode along an axial path of travel, rather than radially through the electrode. Since the axial length of the front electrode is substantially greater than the radial wall thickness of the electrode, the life of the front electrode is thus significantly extended.

In accordance with another aspect of the present invention, the vortex generating means includes programmed control means for varying the pressure of the gas back and forth between predetermined limits and in accordance with a predetermined program. This variation in pressure is preferably continuous, which results in the attachment point of the arc being continuously moved axially back and forth along the length of the bore of the rear electrode by the changing pressure, while the arc is being rotated by the vortical flow of gas, to thereby distribute the erosion of the rear electrode and extend the life thereof. In the case of a non-transfer torch, the continuously varying pressure and the vortical flow of the gas also serve to distribute the arc attachment point on the radial shoulder of the cup-shaped front electrode to distribute the erosion thereof, and to further extend its life.

Some of the objects and advantages of the present invention having been stated, others will appear as the description proceeds, when taken in conjunction with the accompanying drawings, in which FIG. 1 is a side elevation view of a plasma arc torch which embodies the features of the present invention;

Figures 1, 2:
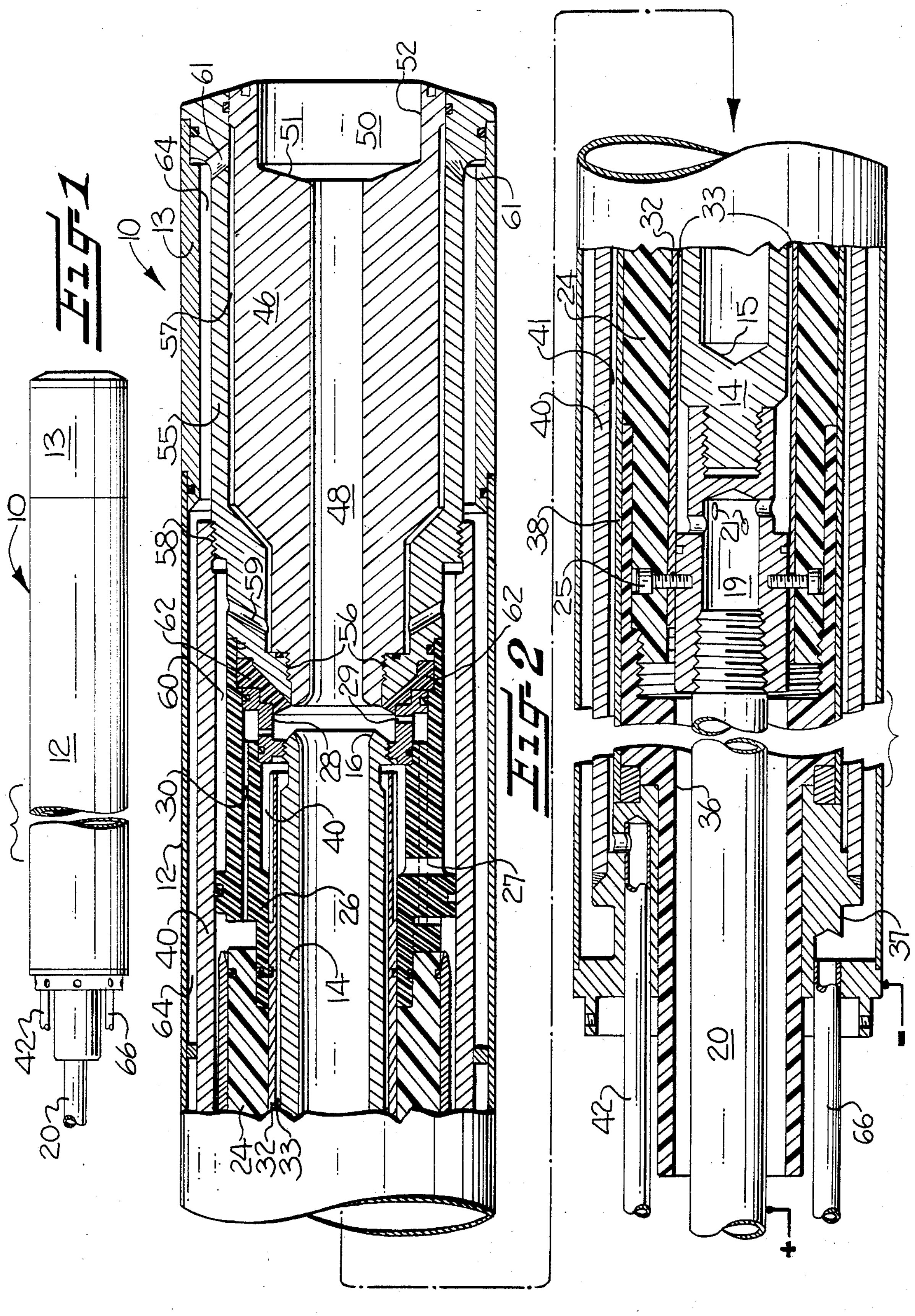
FIG. 2 is an enlarged sectional view of the torch shown in FIG. 1.
Figure 3:
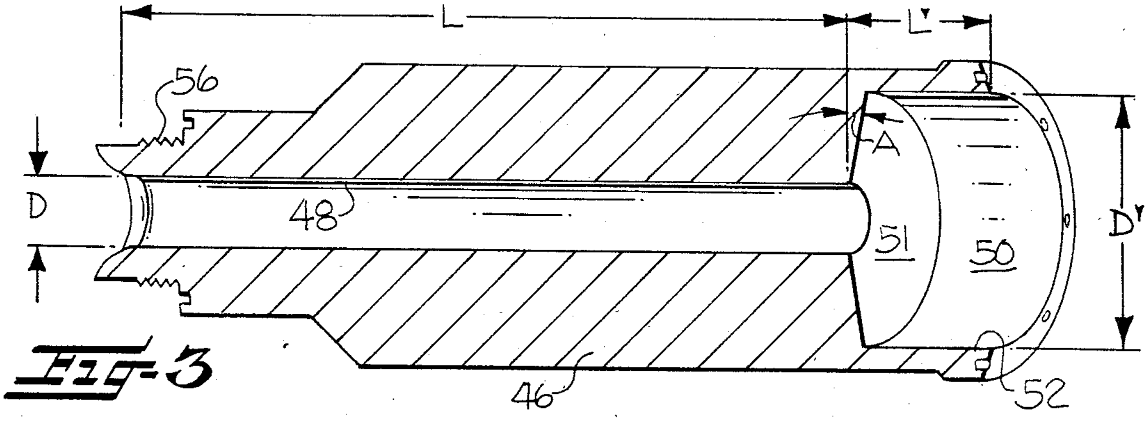
FIG. 3 is a sectional view of the front cup-shaped electrode of the torch shown in FIG. 1.
Figure 4:
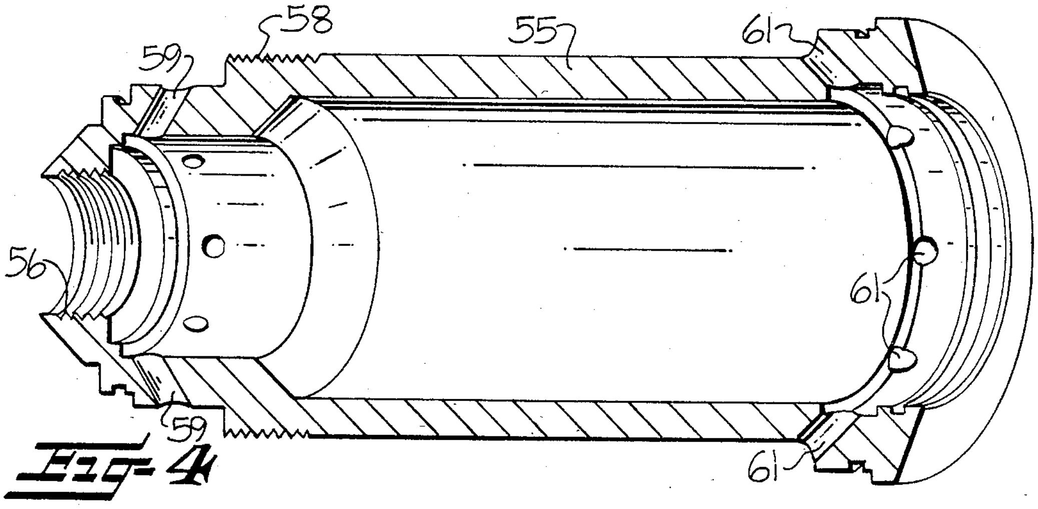
FIG. 4 is a sectional view of the outer sleeve associated with the front electrode in the torch of FIG. 1.

Referring more particularly to the drawings, there is illustrated a plasma arc torch 10 which is adapted for operation in the non-transfer arc mode, and which embodies the features of the present invention. In the illustrated embodiment, the torch comprises an outer housing, which includes a metal cylindrical rear housing section 12 and a coaxial metal extension 13 at the forward end of the section 12.

A rear electrode 14 is mounted within the outer housing and comprises a tubular metal member having a closed inner end 15 and an open outer end 16. The inner end 15 of the electrode is threadedly mounted in one end of a metal electrode holder 18. The holder 18, in addition to serving as a means for supporting the rear electrode, also serves as a means for delivering electrical current from an external power source to the rear electrode as further described below. The holder 18 also serves as a fluid conduit for the fluid cooling system, and for this purpose the rear end of the holder includes a tubular bore 19 which is threadedly coupled to a copper tube 20. The tube 20 in turn is connected to an external fluid supply, such as a municipal water system. The bore 19 in the rear end of the holder 18 also includes radial apertures 21 for the passage of the water therethrough, and in the manner further described below.

The holder 18 is supported within a coaxial rear sleeve 24 by means of the bolts 25, and the forward end portion of the rear sleeve 24 mounts a tubular body member 26. The sleeve 24 and body member 26 are both formed of an electrically insulating material, such as a suitable phenolic resin. The body member 26 includes a number of radial apertures 27 therethrough, and it mounts an annular gas vortex generator 28. The generator 28 includes a plurality of tangentially directed apertures 29 through the wall thereof, and which is threadedly mounted to the outer end of the rear electrode 14. The tubular body member 26 also includes a plurality of axially directed gas passages 30 which communicate with the apertures 29 of the vortex generator as further described below. A water guide 32 in the form of a thin walled metal tube, is interposed between the holder 18 and rear sleeve 24, and the water guide 32 extends forwardly between the rear electrode 14 and the rear sleeve 24 while defining a narrow annular water passage 33 therebetween which is part of the fluid cooling system as further described below.

The rear end portion of the rear sleeve 24 is threadedly mounted to an insulator sleeve 36, which in turn is supported within the rear end cap 37 of the torch. The insulator sleeve 36 also mounts a coaxial metal inner gas shroud 38 which closely overlies the exterior surface of the insulator sleeve 36 and rear sleeve 24, and the end cap 37 mounts a coaxial outer gas shroud 40 which overlies the inner shroud in spaced relation so as to define an annular gas passage 41 therebetween. The gas passage 41 communicates with the gas inlet duct 42 via the radial aperture 43 in the end cap 37. The forward end of the passage 41 communicates with the axial passages 30 in the tubular body member 26, and such that gas delivered from the inlet duct 42 is directed to the tangential apertures 29 in the wall of the vortex generator 28.

The plasma arc torch 10 further comprises a front electrode 46 comprising a tubular metal member having a bore therethrough. The front electrode 46 is mounted within the housing and in coaxial alignment with the rear electrode 14, with the inner end of the front electrode disposed adjacent and slightly spaced from the open outer end 16 of the rear electrode 14. The bore of the front electrode 46 includes an inner cylindrical end portion 48 and an outer end portion 50 which is cup-shaped in cross section to define an outwardly facing radial shoulder 51 and a cylindrical portion 52. The diameter D' of the cylindrical portion 52 is preferably between about at least one and one half to four times the diameter D of the inner cylindrical end portion 48 of the bore of the electrode, such that the radial shoulder 51 has a width of substantial dimensions. In the illustrated embodiment, the radial shoulder 51 is in the form of a frustum of a cone with the wall thereof being inclined forwardly at an angle A of about 10°–12° from a plane disposed perpendicularly to the axis of the bore of the electrode 46.

The axial length L of the inner end portion 48 will be seen to be substantially longer than the axial length L' of the cup-shaped outer end portion 50. Also, the radial thickness of the wall of the front electrode is greater than the radial dimension of the outwardly facing radial shoulder 51, over at least the majority of the axial length of the front electrode extending rearwardly from the radial shoulder. Thus a substantial mass of material is located rearwardly or axially behind the radial shoulder 51.

The front electrode 46 is releasably mounted to a tubular front sleeve 55 by means of the threaded interconnection 56, and the front sleeve 55 coaxially overlies a substantial portion of the length of the front electrode 46, with the front sleeve being spaced from the front electrode along substantially its entire length to define an annular water passage 57 therebetween. The rear end of the front sleeve 55 engages and supports the end of the tubular body member 26, and the rear end of the sleeve is threadedly mounted to the forward end of the outer gas shroud at 58. The front sleeve 55 also includes a plurality of radial passages 59, so that the passage 57 communicates with the space 60 between the tubular body member 26 and outer gas shroud 40. Also, the front end of the sleeve 55 supportingly engages the forward end of the electrode 46, and a plurality of radial apertures 61 extend through the forward end of the front sleeve for the purposes set forth below. In addition, an annular insulating block 62 is mounted in the gap between the rear end of the front sleeve 55 and the vortex generator 28.

The forward extension 13 of the outer housing will be seen to overlie the front sleeve 55 to define an annular passage 64 therebetween, and the forward end of the extension 13 engages and supports the forward end of the front electrode 46. Also, the rear section 12 of the housing is spaced from the outer gas shroud 40 to form a continuation of the passage 64, which communicates with the cooling system fluid outlet duct 66 which is attached to the rear end cap 37.

From the above description, it will be seen that the plasma torch of the present invention includes a coolant flow path which extends so as to be in serial heat exchange relation with the rear electrode 14 and then the front electrode 46. Thus a fluid coolant may be circulated through the coolant flow path to remove heat from the torch during operation thereof. More particularly, the coolant flow path includes the copper tube 20, which delivers the water or other coolant to the rear bore 19 of the holder 18. The water then passes through the radial apertures 21 and into the annular passage 33 along the outside of the rear electrode. The water then passes through the apertures 27 in the tubular body member 26 to the passage 60, and then through the passages 59 in the front sleeve 55 to the annular passage 57 along the outside of the front electrode. The water then moves through the apertures 61 at the forward end of the sleeve 55, and it then moves through the passage 64 rearwardly to the outlet duct 66.

A gas such as air may be delivered to the vortex generator 28 from the gas inlet duct 42, and so that the gas will pass along the annular passage 41 between the inner and outer shrouds. Upon reaching the tubular body member 26, the gas will pass through the axial apertures 30, and to the vortex generator 28. The gas then passes through the tangential apertures 29 in the vortex generator, so as to form a vortical flow of gas in the space between the rear and front electrodes, and which is in coaxial alignment with the two electrodes.

It will also be apparent from the above description that the front electrode 46 is releasably connected to the tubular front sleeve 55 so as to permit the separation and replacement of the front electrode without replacement of the sleeve. More particularly, the front electrode 46 may be removed by gripping the bore of the electrode with an internal wrench, and unthreading the electrode from the sleeve. A new front electrode may then be installed by reversing this procedure.

Figure 5:
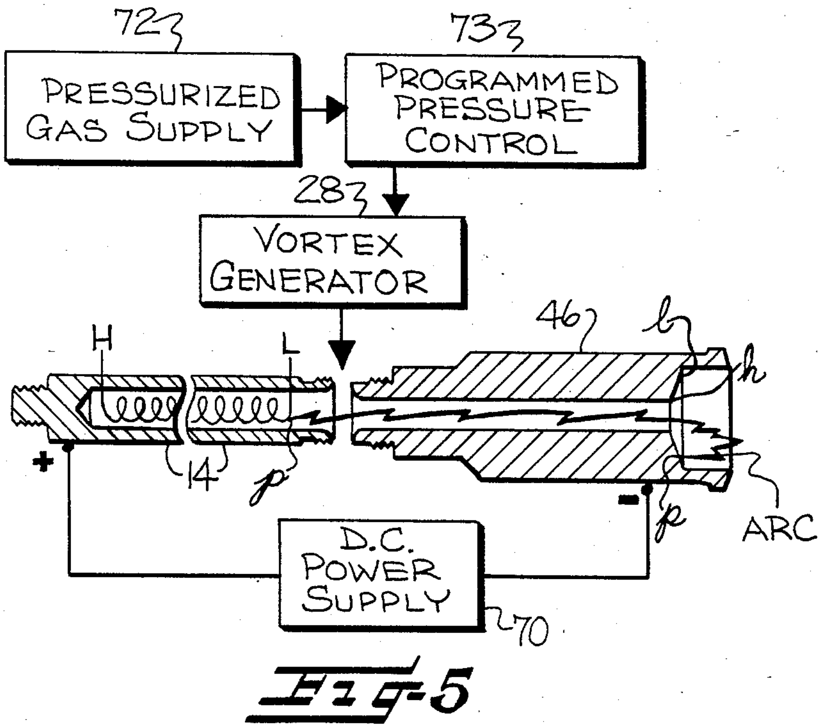
FIG. 5 is a schematic illustration of the rear and front electrodes of the torch illustrated in FIG. 1, and illustrating the movement of the arc attachment point on both the rear and front electrodes.

As best seen in FIG. 5, the plasma arc torch 10 of the present invention further includes power supply means 70 operatively connected to the rear and front electrodes for generating an arc which is adapted to extend axially from the rear electrode 14 through the vortical flow of gas and to an attachment point located on the radial shoulder 51 of the front electrode 46. Thus any erosion of the material of the front electrode will occur along an axial path of travel rather than radially through the electrode, to thereby extend the life of the front electrode. As illustrated, the positive side of the direct current power supply is connected to the copper tube 20, such that the current may be delivered through the electrode holder 18 and to the rear electrode 14. The negative or grounded side of the power supply is connected to the end cap 37, which is electrically connected to the front electrode 46 via the outer gas shroud 40 and front sleeve 55.

Figure 6:
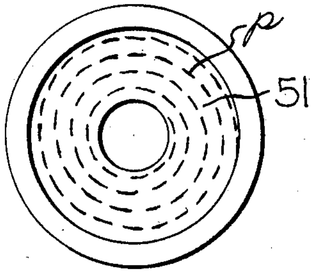
FIG. 6 is an enlarged end view of the front electrode as illustrated in FIG. 5.

As also illustrated schematically in FIG. 5, the vortex generating means includes a pressurized source of gas 72, and programmed control means 73 for continuously varying the pressure of the gas between predetermined limits. Thus upon delivery of the gas to the vortex generator 28, the vortical flow of gas will cause the attachment point P of the arc to the bore of the rear electrode 14 to be rotated, while being moved axially back and forth along a substantial portion of the length of the bore by the varying pressure of the gas. As illustrated, the arc attachment location moves between the point H, representing the high pressure location, and the point L, representing the low pressure location. As a result, the erosion will be uniformly distributed along a substantial portion of the bore, thereby extending the life of the rear electrode. With respect to the front electrode, it is believed that the arc will attach at the low pressure point within the cup-shaped portion of the bore, and the attachment point may be established on the shoulder 51 by proper coordination of the gas flow rate (i.e. pressure) and power level. The continuous variation in pressure will cause the attachment point p on the radial shoulder 51 to move radially between the points h (high pressure location) and 1 (low pressure location) as seen in FIG. 5, and the vortical flow pattern of the gas will cause the attachment point to be rotated around the bore. Thus the varying pressure and vortical flow pattern cooperate to move the attachment point p along a spirally directed path on the shoulder 51 and as seen in FIG. 6, with the attachment point p spiraling inwardly as the pressure increases and spiraling outwardly as the pressure decreases. By this arrangement, the erosion along both the bore of the rear electrode and the radial surface of the front electrode is continuously moved and distributed over a relatively large surface area, to effectively extend the life of each electrode.

Referring again to the front electrode 46, it will be seen that the erosion caused by the attachment of the arc may extend axially for a substantial distance before failure of the electrode, by reason of the substantial mass of material rearwardly of the radial shoulder. The only effective limitation on the wear distance is the fact that in order to maintain the arc attached to the radial shoulder 51, it is believed that the ratio of the axial length L of the inner bore portion to the diameter thereof must be greater than about four. Thus the erosion may continue until the critical length/diameter ratio is approached, at which point the arc will transfer to the adjacent workpiece.

As a specific non-limiting example, a torch was constructed in accordance with the present invention and which had a power capacity of 150 KW. The bore of the rear electrode 14 had a length of 7 inches and a diameter of 0.90 inches. The bore 48 of the front electrode 46 had a diameter D of 0.60 inches and a length L of 6.68 inches, and The cup-shaped portion 50 had a diameter D' of 2.20 inches and a length L' of 1.32 inches. The air was introduced into the vortex generator 28 at a pressure which oscillated between about 20 to 50 psi, which resulted in an oscillating mass flow rate of between about 5 to 40 cubic feet per minute. The rate of change in the pressure was about 4 psi per second.

In the drawings and specification there has been set forth a preferred embodiment of the invention, and although specific terms are employed, they are used in a generic and descriptive sense only, and not for purposes of limitation.

That which is claimed:

1. A plasma arc torch adapted to operate in the non-transfer arc mode and which is characterized by long electrode life, and comprising a torch housing, a rear electrode mounted within said housing and comprising a tubular metal member having a closed inner end and an open outer end, a front electrode comprising a tubular metal member having a bore therethrough, said front electrode being mounted within said housing and in coaxial alignment with said rear electrode and having an inner end adjacent said open outer end of said rear electrode and an opposite outer end, and with said bore including an inner cylindrical end portion and an outer end portion which is cup-shaped in cross section to define an outwardly facing radial shoulder, and with said inner cylindrical end portion having a substantial axial length, a tubular sleeve member mounted to said housing and coaxially surrounding said front electrode in a spaced apart arrangement so as to define an annular passageway between said front electrode and said sleeve which extends along substantially the entire axial length of said front electrode, coolant flow path means extending through said housing and communicating with said annular passageway, and such that a fluid coolant may be circulated through said annular passageway to remove heat from said front electrode during operation of the torch, vortex generating means for generating a vortical flow of a gas at a location intermediate said rear and outer electrodes and which is in coaxial alignment with said rear and front electrodes, power supply means operatively connected to said rear and front electrodes for generating an arc which is adapted to extend axially from said rear electrode through said vortical flow of gas and to an attachment located on said bore of said front electrode, and means for coordinating said vortex generating means and said power supply means such that the arc attaches on said radial shoulder of said front electrode, and whereby the attachment of the arc to the radial shoulder results in erosion of the material of the front electrode along an axial path of travel rather than radially through the electrode, to thereby extend the life of the front electrode.

2. The plasma arc torch as defined in claim 1 wherein said inner cylindrical end portion of said bore of said front electrode has an axial length which is substantially longer than that of said cup-shaped outer end portion.

3. The plasma arc torch as defined in claim 2 wherein the ratio of the axial length of said inner cylindrical portion of the bore of said front electrode to the diameter thereof is greater than about four.

4. The plasma arc torch as defined in claim 3 wherein said bore of said cup-shaped outer end portion of said front electrode includes a cylindrical portion having a diameter of between about one and one half to four times the diameter of said inner cylindrical portion of said bore.

5. The plasma arc torch as defined in claim 4 wherein said outwardly facing radial shoulder of said front electrode is in the form of a frustum of a cone with the wall thereof being inclined forwardly at an angle of about 10°–12° from a plane disposed perpendicularly to the axis of said bore of said front electrode.

6. The plasma arc torch as defined in claim 1 wherein said coolant flow path means extends serially along the outer surface of said rear electrode and through said annular passageway, and such that a fluid coolant may be circulated through said coolant flow path means to directly remove heat from both said rear electrode and front electrode during operation of said torch.

7. The plasma arc torch as defined in claim 6 wherein said front electrode is releasably connected to said tubular sleeve member so as to permit the separation and replacement of said front electrode without replacement of said tubular sleeve member.

8. The plasma arc torch as defined in claim 1 wherein said vortex generating means comprises programmed control means for varying the pressure of the gas according to a predetermined program and so as to distribute the arc attachment point both within said rear electrode and on said radial shoulder of said front electrode and thereby distribute the erosion thereof.

9. The plasma arc torch as defined in claim 8 wherein said programmed control means is programmed to continuously vary the pressure of the gas between predetermined limits.

10. The plasma arc torch as defined in claim 1 wherein said power supply means includes a direct current source, with the anode thereof connected to said rear electrode and the cathode thereof connected to said front electrode.

11. A method of operating a plasma arc torch in the nontransfer arc mode and which is characterized by long electrode life, with said torch comprising a torch housing, a rear electrode mounted within said housing and comprising a tubular metal member having a closed inner end and an open outer end, a front electrode comprising a tubular metal member having a bore therethrough, said front electrode being mounted within said housing and in coaxial alignment with said rear electrode and having an inner end adjacent said open outer end of said rear electrode and an opposite outer end, and with said bore including an inner cylindrical end portion and an outer end portion which is cup-shaped in cross section to define an outwardly facing radial shoulder, and with said inner cylindrical end portion having a substantial axial length, vortex generating means for generating a vortical flow of a gas at a location intermediate said rear and outer electrodes and which is in coaxial alignment with said rear and front electrodes, and power supply means operatively connected to said rear and front electrodes for generating an arc which is adapted to extend axially from said rear electrode through said vortical flow of gas and attach to said front electrode, said method comprising the steps of coordinating the gas flow rate of said vortex generating means and the level of said power supply means such that the arc attaches on said radial shoulder of said front electrode, and whereby the attachment of the arc to the radial shoulder results in erosion of the material of the front electrode along an axial path of travel rather than radially through the electrode, to thereby extend the life of the front electrode.

12. The method as defined in claim 11 comprising the further step of varying the pressure of the gas supplied to said gas vortex generating means so as to distribute the arc attachment point within said rear electrode and on said radial shoulder of said front electrode and thereby distribute the erosion thereof.

* * * * *